Patented May 10, 1938

2,117,106

UNITED STATES PATENT OFFICE 2,117,106

BRAZED ARTICLE

Horace F. Silliman, Waterbury, Conn., assignor to The American Brass Company, Waterbury, Conn., a corporation of Connecticut No Drawing. Application February 21, 1936, Serial No. 65,063

11 Claims. (Cl. 148—21.2)

My invention relates to articles made by brazing, and more particularly to articles, the principal parts of which are formed from a heat hardenable, copper-base alloy and joined by brazing in a neutral or reducing atmosphere without a brazing flux.

The object of my invention is to provide a brazed article having a high corrosion resistance, high strength and good spring qualities.

The term brazing as used in this specification is understood to mean a form of joining, in which a metal or alloy called solder is caused to melt, then solidify, in such a manner as to unite metallic surfaces.

Many articles with brazed joints are made commercially but all of these have certain disadvantages which are not found in the article which I have invented. For example, steel articles brazed with copper or with copper alloys have high strength and good spring qualities but they rust when exposed to a moist atmosphere. Furthermore, they dissolve rapidly when exposed to dilute acids. Steel itself has a poor resistance to corrosion. The articles made by brazing steel parts are even more susceptible to attack by corrosive agents because at the contact of the steel with the copper alloy brazing solder in the presence of moisture or aqueous solutions, there is formed an electrolytic cell which greatly accelerates the disintegration of the steel.

Aluminum and magnesium-base alloys have a better resistance to atmospheric corrosion but they will not withstand the attack of even very slightly acid or very slightly alkaline agents. Also they are very weak and they have no qualities which make them suitable as a material for springs.

Articles formed from copper and the copper alloys, brass, bronze, and nickel silver have a satisfactory corrosion resistance but after being heated to the brazing temperature they are but little stronger than the best of the aluminum alloys.

I have found that all of these difficulties can be overcome by making the article from one of a special series of copper alloys, brazing the parts together without a flux in an atmosphere of hydrogen or of any suitable neutral or reducing gas or mixture of neutral and reducing gas, and subjecting the article to a certain heat treatment.

The alloys suitable for this purpose comprise:

| | |
|---|---|
| Tin | 3 to 20% |
| Nickel | 3.5 to 40% |
| Copper | Balance |

When these alloys contain 3% to 10% tin, they can be produced in all wrought forms, such as sheet, strip, rod, wire, tubes, profiles and the like. With the tin content between 10% and 20% the alloys are not as suitable for commercial rolling and drawing, but they make desirable castings particularly where good wear resistance and good bearing properties are required.

I have discovered that this alloy not only can be hardened and its tensile strength increased (to and above 100,000 pounds per square inch) by heat treatment but that it can also be hydrogen brazed or brazed in a neutral or reducing atmosphere without the use of a brazing flux. Therefore fabricated articles may be made by brazing together two or more parts made of this alloy, or one or more parts made of this alloy may be brazed to parts composed of other metals, and then after the brazing operation the article may be heat treated to harden the parts made of this alloy. As it can be brazed without the use of a flux the usual disadvantages of the presence of residual brazing flux in the finished article are eliminated.

This alloy can be used either as a solder to join metal parts of higher melting points, as steel, or steel and parts made of a copper base alloy of a higher melting point than this alloy; or it can be used to compose parts of the article which are joined by a lower melting point solder, as hard solder, etc., and in each case the hydrogen brazing or brazing in a neutral or reducing atmosphere may be done without the use of a brazing flux.

Other compound metal articles may be formed in a similar manner. For example, I may braze together in the manner described a bar of the copper-nickel-tin alloy and a bar of an alloy with a low coefficient of thermal expansion like the nickel-iron alloy known as "Invar" and roll the compound bar into a form suitable for use as a bi-metal in a thermostat. I am not however confined to the use of "Invar" but may use other suitable metals.

Some articles will be improved if the alloy is modified by the substitution of one or more additional metals for a part of the copper. For example, when an article is formed with cutting tools, that is to say, by machining, the inclusion of 1% of lead improves the cutting qualities of the alloy.

The elements which may be added to the copper-nickel-tin alloy in quantities up to 5% of one element and not over 10% of two or more combined to produce desirable small variations in properties comprise manganese, iron, cobalt, zinc, cadmium, silver, gold, platinum, lead, tantalum, tungsten and arsenic. Certain elements interfere with the brazing operation and must be excluded from the alloy except in very small amounts. These are aluminum, silicon, beryllium, magnesium, phosphorus, titanium, vanadium and chromium.

In fabricating my article I first assemble the part or assembly of parts in the relative position they are to occupy in the finished product, employing, if necessary, a suitable holder, jig or fixture. The space left between the metal surfaces to be joined usually will be about 0.002 to 0.004 inch. The brazing solder in some convenient form, such as wire, sheet, strip, tube, granules, paste or powder is laid adjacent to or in the joint in such a manner that it will not be dislodged during the subsequent handling.

Many copper-base and silver-base solders are suitable for use in making my article. I may employ any of the so-called "hard" solders which has a flow point below the melting point of the copper-nickel-tin alloy and which is available in the form required for the particular article being made.

With the parts in their proper position and the solder in place, I then put the whole assembly into a furnace in which the air atmosphere has been replaced by hydrogen or by some neutral or reducing gas or mixture of neutral or reducing gases, and heat it to the flow point of the solder.

If, during the assembling operation, the solder has been placed so as to fill the narrow space between the metallic surfaces to be joined, it remains there as it melts and partially alloys with the surfaces. Sometimes, however, it is inconvenient to fill the space with solid solder as the article is assembled. In this case sufficient solder is placed adjacent to the joint so that when it melts it will flow and by capillary action be drawn into the said space. Thus, whether the solder is put into the joint or adjacent to the joint the action and its effect will be similar.

If my article is not quenched from approximately 600° C. to 850° C. before the hardening heat treatment at 200° C. to 550° C., it does not develop the best possible strength and spring properties. At times, however, it is not convenient to quench the article from the proper temperature as it cools from the brazing temperature. Therefore I may cool the article from the brazing temperature in any convenient way and subsequently reheat it for a period of time up to several hours at 600° C. to 850° C. and quench in water, oil, molten salt or any other convenient liquid or in an air blast.

After having brazed the article in the manner described above, I may subject it to a heat treatment which develops the high strength and spring properties. This heat treatment consists of heating the article for a predetermined period of time at a predetermined temperature. The temperature lies within the range approximately 200° C. to 550° C. but the period of time varies considerably. The exact time and temperature of the heat treatment for any specific article is governed by the composition of the alloy from which it is made and the properties desired. For an article made from the alloy comprising tin 7.5%, nickel 7.5%, and copper, a heat treatment of four hours at 350° C. is one of the best. For example,

|  | Tensile strength lbs./sq. in. | Elongation percent in 2 in. | Rockwell hardness "G" scale |
|---|---|---|---|
| Before heat treatment | 62,000 | 45.0 | 14 |
| Heat treated 4 hours at 350° C. | 131,000 | 5.8 | 91 |

A heat treatment of one hour at 375° C. gives practically the same results.

As the result of an exhaustive series of tests I have found that certain elements interfere with the brazing operation. These elements seem to react with traces of impurities in the neutral or reducing gas atmosphere and allow the formation of a thin film over the surface of the alloy. This film prevents the solder from wetting the alloy so that joints cannot be made. The elements which act in this manner are aluminum, beryllium, magnesium, silicon, phosphorus, titanium, vanadium and chromium, and therefore if any of these elements is present in appreciable amount the metal parts cannot be brazed in the manner described.

Another series of elements do not have the film-forming characteristic under the conditions under which I braze my article. These comprise copper, zinc, cadmium, iron, cobalt, nickel, manganese, gold, silver, platinum, lead, tin, tantalum, tungsten and arsenic.

I consider it within the scope of my invention to make one or more parts of my article from the heat-hardenable copper-nickel-tin alloy and other parts from any alloy composed only of elements selected from the series mentioned above, namely copper, zinc, cadmium, iron, cobalt, nickel, manganese, gold, silver, platinum, tin, lead, tantalum, tungsten and arsenic. Thus I may form certain spring parts of an article from the copper-nickel-tin alloy but in order to reduce the cost of material I could use brass, a copper-zinc alloy, for other parts which were not to be flexed.

One of the applications where my invention is of especial value is in the production of base metal sheet, rod, wire, tubes, and other desirable shapes coated with noble metals such as gold, silver, tantalum or platinum or their alloys. The alloys ordinarily used as base metals such as brass, bronze, and nickel silver are not strong enough for many purposes. High strength alloys like beryllium-copper, copper-nickel-aluminum-zinc, copper-nickel-silicon, and copper-cobalt-silicon cannot be joined to gold, silver, platinum and their alloys by brazing or silver soldering in reducing or neutral gases without a flux because the solders will not wet them and therefore will not flow. If a flux is used to dissolve and remove the film of oxide which prevents the flow of the solder this flux cannot be entirely removed from between the layer of base metal and noble metal and is apt to produce blisters which give trouble during subsequent rolling, drawing, blanking and other forming operations.

Under my invention the copper-nickel-tin alloy and the noble metal may be clamped together with a thin layer of brazing solder between them without flux, heated in a neutral or reducing atmosphere and cooled as described above. This bimetal sheet, rod, wire, tube, or whatever form it may be, is then rolled, drawn, blanked, formed, pressed and worked in any other manner until it assumes the desired shape. After all the shaping operations are completed, the article may if desired be brazed again with a solder having a lower melting point than that used to join the copper-nickel-tin alloy and the noble metal and without a flux, after which it is heat treated to develop the required mechanical properties.

Another example of the article which I have invented is a metal bellows. This bellows is made by brazing together sheet metal sections. A bellows of this type which is satisfactory from the mechanical standpoint can be made from steel sheet by brazing, but when used in contact with water and aqueous liquors, steel rusts very rapidly. Making the bellows from copper base alloys prevents rust. However, all copper alloys, except those comprising copper, nickel and tin (in the absence of aluminum, silicon, beryllium, magnesium, phosphorus, titanium, vanadium and chromium) are objectionable either because they lack the necessary spring qualities after brazing or because they cannot be brazed without a flux. In this application it is essential that the use of a flux be avoided because even the slightest discontinuity resulting from residual flux allows leakage of the gas or liquid which the bellows contains and thus renders it useless for its intended purpose. Furthermore, the excess flux which adheres to the inside surfaces of the bellows cannot be removed after the bellows is brazed and soon causes pitting especially when it contains hygroscopic compounds.

The examples given above serve merely to show the essential features of my article and they should not be considered the only articles within the scope of this invention. The appended claims should be construed to cover any corrosion-resisting article which is formed from the alloys mentioned joined by brazing or silver soldering in an atmosphere of reducing or neutral gas or mixture of gases and may have high strength and good spring properties imparted to it by the heat treatment described.

Having thus set forth the nature of my invention, what I claim is:

1. A brazed article comprising a plurality of metal parts of which at least one of said parts is composed of a copper base alloy comprising 3% to 20% tin, 3.5% to 40% nickel and balance substantially copper, said alloy being characterized by being hardenable by heat treatment, and said parts having been joined together by brazing without flux in a neutral or reducing atmosphere whereby the brazed joint is free of flux.

2. A brazed article comprising a plurality of metal parts composed of an alloy comprising 3% to 20% tin, 3.5% to 40% nickel, and balance substantially copper, and said parts having been joined together by brazing without flux in hydrogen or other suitable neutral or reducing gas or gas mixture so that the brazed joint is free of flux.

3. A brazed article comprising a plurality of metal parts composed of an alloy comprising 3% to 20% tin, 3.5% to 40% nickel, and balance substantially copper, said parts having been joined together by brazing without flux in a reducing or neutral atmosphere so that the brazed joint is free of flux, and said alloy having been cooled quickly from a temperature just below the freezing point of the brazing solder and strengthened by reheating at a temperature within the range 200° C. to 500° C.

4. A brazed article comprising a plurality of metal parts composed of an alloy comprising 3% to 20% tin, 3.5% to 40% nickel and balance substantially copper, said parts having been joined together by brazing or hard soldering in a neutral or reducing atmosphere without flux so that the joint is free of flux, and to which article spring qualities have been imparted by heat treatment.

5. A brazed article comprising a plurality of metal parts composed of a heat hardened copper base alloy comprising 3% to 20% tin, 3.5% to 40% nickel and balance substantially copper, and said parts being joined by one or more brazed joints which were made by heating in a neutral or reducing atmosphere without flux so that the joint or joints are free of flux.

6. A brazed article comprising a plurality of parts joined together by brazing in a neutral or reducing atmosphere without flux so that the joint is free of flux, said parts being composed of a copper base alloy comprising 3% to 20% tin, 3.5% to 40% nickel and balance substantially copper which is characterized by being corrosion resistant and hardenable by heat treatment.

7. A brazed flexible metal bellows comprising a plurality of heat hardened metal parts composed of a copper base alloy comprising 3% to 20% tin, 3.5% to 40% nickel and balance substantially copper, and which parts were joined by brazing without flux by application of heat while in an atmosphere of hydrogen or other suitable reducing or neutral gas or gas mixture so that the joints are free of flux.

8. A brazed flexible metal bellows comprising sheet metal sections composed of an alloy of 3% to 20% tin, 3.5% to 40% nickel and balance substantially copper, which are brazed together without flux in a neutral or reducing atmosphere so that the brazed joints are free of flux, and said plates being cooled quickly from a temperature of 600° C. to 850° C. and strengthened by reheating at a temperature within the range 200° C. to 500° C.

9. A method of making a brazed article comprising brazing together in a neutral or reducing atmosphere without flux a plurality of parts at least one of which is composed of a worked, heat hardenable alloy comprising 3% to 10% tin, 3.5% to 40% nickel, and balance substantially copper, so that the brazed joint is free of flux.

10. A method of making a flexible bellows comprising brazing together in a neutral or reducing atmosphere without flux a plurality of parts composed of a worked alloy comprising 3% to 10% tin, 3.5% to 40% nickel and balance substantially copper, cooling quickly from a temperature of 600° C. to 850° C. and maintaining at a temperature of 200° C. to 550° C. for a sufficient time to produce a material increase in hardness.

11. A method of making a flexible metal bellows comprising brazing together a plurality of flexible parts by heating in a neutral or reducing atmosphere without flux so that the brazed joint is free of flux, said parts being composed of a worked alloy comprising 3% to 10% tin, 3.5% to 40% nickel and balance substantially copper.

HORACE F. SILLIMAN.